(12) United States Patent
Reif et al.

(10) Patent No.: US 9,478,037 B2
(45) Date of Patent: Oct. 25, 2016

(54) TECHNIQUES FOR EFFICIENT STEREO BLOCK MATCHING FOR GESTURE RECOGNITION

(75) Inventors: Dror Reif, Be'er-Yacoov (IL); Gila Kamhi, Zichron Yaakov (IL); Barak Hurwitz, Kibbutz Alonim (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/997,991

(22) PCT Filed: Dec. 8, 2011

(86) PCT No.: PCT/US2011/063993
§ 371 (c)(1),
(2), (4) Date: Aug. 8, 2014

(87) PCT Pub. No.: WO2013/085525
PCT Pub. Date: Jun. 13, 2013

(65) Prior Publication Data
US 2015/0206313 A1 Jul. 23, 2015

(51) Int. Cl.
*G06K 9/00* (2006.01)
*G06T 7/00* (2006.01)
*G06F 3/01* (2006.01)
*G06K 9/32* (2006.01)
(Continued)

(52) U.S. Cl.
CPC ............ *G06T 7/0075* (2013.01); *G06F 3/017* (2013.01); *G06K 9/00234* (2013.01); *G06K 9/00335* (2013.01); *G06K 9/3233* (2013.01); *G06T 7/2013* (2013.01); *G06T 7/2086* (2013.01); *G06T 7/408* (2013.01); *G06T 2207/10021* (2013.01); *G06T 2207/10024* (2013.01); *G06T 2207/20021* (2013.01); *G06T 2207/20092* (2013.01); *G06T 2207/20101* (2013.01); *G06T 2207/20104* (2013.01); *G06T 2207/20144* (2013.01); *G06T 2207/30196* (2013.01)

(58) Field of Classification Search
CPC .... G06F 3/017; G06F 3/04842; G06F 3/013; G06F 17/30917; G06T 7/0075; G06T 7/0085; G06T 7/2033; G06T 3/40; G06T 7/20; G06T 7/2013; G06T 7/2086; G06T 7/408; G06K 9/00355; G06K 9/00335; G06K 9/00389; G06K 9/04
See application file for complete search history.

(56) References Cited

U.S. PATENT DOCUMENTS

| 2002/0041327 | A1 | 4/2002 | Hildreth et al. |
| 2004/0119716 | A1* | 6/2004 | Park .................. G06T 7/0071 345/473 |
| 2008/0166022 | A1* | 7/2008 | Hildreth ............. G06F 3/017 382/107 |

(Continued)

FOREIGN PATENT DOCUMENTS

WO 2011036618 A2 3/2011

OTHER PUBLICATIONS

Faujeras et al Real time correlation based stereo (algorithm, Implementations, and Applications, 1993).*

(Continued)

*Primary Examiner* — Amara Abdi

(57) ABSTRACT

Techniques to provide efficient stereo block matching may include receiving an object from a scene. Pixels in the scene may be identified based on the object. Stereo block matching may be performed for only the identified pixels in order to generate a depth map. Other embodiments are described and claimed.

28 Claims, 10 Drawing Sheets

610

(51) Int. Cl.
*G06T 7/20* (2006.01)
*G06T 7/40* (2006.01)

(56) References Cited

U.S. PATENT DOCUMENTS

2008/0199070 A1* 8/2008 Kim .................. H04N 13/0497
 382/154
2010/0160835 A1 6/2010 Shin et al.
2010/0329511 A1* 12/2010 Yoon .................. G06K 9/00382
 382/103
2013/0011049 A1* 1/2013 Kimura ................ G06T 7/2053
 382/155

OTHER PUBLICATIONS

Faujeras et al (Real time correlation based stereo: algorithm, Implementations, and Applications, 1993).*
International Search Report and Written Opinion, Mailed Date: Aug. 27, 2012 Application No. PCT/US2011/063993, Filed Date: Dec. 8, 2011, pp. 10.
Extended European Search Report received for European patent Application No. 11877128.6, mailed Jul. 6, 2015, 8 pages.
Faugeras, et al., "Real Time Correlation Based Stereo: Algorithm, Implementations and Applications", Inrea Sophia-Antipolis, XP-002354985, 2013, 54 pages.
Shibahara et al., "A Sub-Pixel Stereo Correspondence Technique Based ID Phase-only Correlation", Image Processing, IEEE Conference on Image Processing, Sep. 2007, 4 pages.

* cited by examiner

200

Techniques to Improve Stereo
*123*

- Auto Exposure of an Object
  *205*
- Skin Tone Segmentation
  *210*
- Region of Interest
  *215*
- Adaptive Setting of Disparity Range
  *220*
- Feedback from a Higher Level Application
  *225*

*FIG. 2*

TECHNIQUES FOR EFFICIENT STEREO BLOCK MATCHING FOR GESTURE RECOGNITION

BACKGROUND

Gesture recognition technology is often used by a computing device to identify and recognize a user's gestures. Gesture recognition technology may eliminate or reduce the need of a user to communicate with a computer though an external input device. By using gestures, a user may interact more naturally with a computer.

Gesture recognition is often determined through the use of depth extraction methods. Depth extraction, particularly stereo block matching, is essential for accurately tracking and recognizing gestures from a user. Current techniques are highly time consuming and power intensive. It is with respect to these and other considerations that the present improvements have been needed.

BRIEF DESCRIPTION OF THE DRAWINGS

FIG. 2 illustrates one embodiment of techniques to improve stereo.

DETAILED DESCRIPTION

Figure 1:
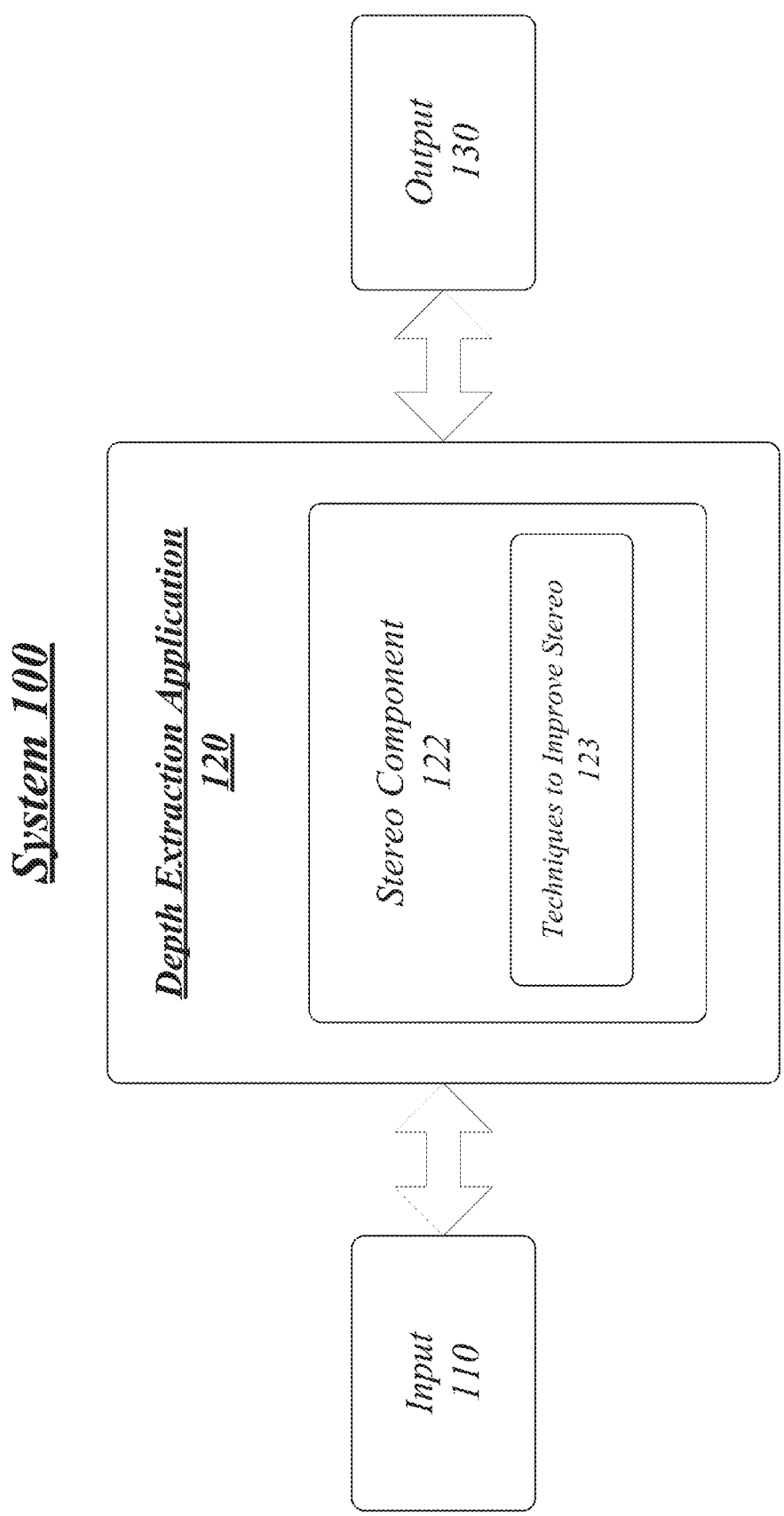
FIG. 1 illustrates an embodiment of a system for depth extraction.

Various embodiments are directed to receiving an object from a scene and identifying pixels in the scene based on the object. A depth map may be generated by performing stereo block matching for only the identified pixels of the scene.

In an embodiment, pixels may be identified using a variety of techniques. These techniques may improve stereo computations, such as, but not limited to, stereo block matching. In an embodiment, stereo block matching may be a type of depth extraction. The techniques to improve stereo may improve depth extraction quality and performance.

Techniques to improve stereo may include, but are not limited to, setting the auto-exposure, skin tone segmentation, determining a region of interest based on movement, determining disparity ranges and receiving feedback from a higher level application. In an embodiment, one or more techniques to improve stereo may be used to identify pixels which may be used in stereo computations. In an embodiment, the techniques to improve stereo may be used to identify pixels which may be used in stereo block matching computations. The quality of the depth map or disparity map may be improved by limiting the search area and therefore limiting the chances to have a mismatch.

By identifying pixels and performing stereo computations for only those pixels, high performance and low power consumption image may be achieved. By reducing the power consumption while still producing a high quality depth or disparity map output, performance and power requirements of perceptual computing usages may be met. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

The system 100 may comprise a depth extraction application 120. In an embodiment, the depth extraction application 120 may include a stereo component 122 with techniques to improve stereo 123.

In an embodiment, a stereo component 122 may be a stereo block matching component. In an embodiment, the stereo component 122 may be utilized to receive an object in a scene. In an embodiment, a scene may be a recorded image. For example, the depth extraction application 120 may include a scene with a hand as the object moving. For example, the scene may include a hand gesturing at a close range.

In an embodiment, the depth extraction application 120 may receive input from two cameras. In an embodiment, a left camera may create a left image and the right camera may create a right image. In an embodiment, a stereo component 122 may obtain left and right images of a scene. In an embodiment, the images from two cameras may be input 110 into the stereo component 122. In an embodiment, both a left and a right camera may view the same scene. The stereo component 122 may determine an offset or the disparity between a left image and a right image. If the object is closer to the cameras, then there may be a larger disparity or offset. If the object is farther away from the cameras, then there may be a smaller disparity or offset.

In an embodiment, the input 110 may be a right and left image from a single frame in a scene. In an embodiment, the input 110 may be a right and left image from a first frame (N) and a right and left image from a second, sequential frame (N+1 or N−1) in the scene. Some of the techniques for stereo may be used on the frame itself while other techniques may obtain information from one frame and apply that information to the stereo block matching computations on a second, sequential frame.

Stereo computations currently may be computationally intensive and require a lot of power as each pixel in a left image from a left camera may be compared with each pixel in a right image from a right camera for every scene. As the entire scene from a first camera may be compared with the entire scene of a second camera, there is a high potential for mismatching pixels. Pixel correspondence may be determined by comparing pairs of points that correspond to the same scene point. For each pixel in a first image, the stereo component 122 may compare with every pixel on the same epipolar line in the second image. The stereo component 122 may pick the pixel with a minimum match cost. For example, an object viewed from a left camera may be compared to the same scene point from the right camera. While the angles are different between the left and right images, the same scene point is compared in order to determine a high quality image. In order to accomplish this, the stereo component 122 may compare with every pixel on the same epipolar line in the right image and pick the pixel with a minimum match cost to a pixel from the left image. By using techniques to improve stereo, the number of pixels to be matched may be reduced and the computational work and the power consumed may be decreased while maintaining a high performance.

One or more techniques to improve stereo 123 may be used by the stereo component 122. In an embodiment, the stereo component 122 may receive information about the scene prior to applying any techniques to improve stereo 123 to the scene. In an embodiment, a user may provide the stereo component 122 with information about the scene. In an embodiment, information about the scene may be automatically provided to the stereo component 122. In an embodiment, prior knowledge of the scene may be used by the stereo component 122 to improve the performance and quality of the depth map output 130.

In an embodiment, the stereo component 122 may determine a portion of the scene based on the object. For example, the stereo component 122 may identify pixels surrounding the object. In an embodiment, the pixels may be identified by using one or more techniques to improve stereo 123.

FIG. 2 illustrates one embodiment of techniques to improve stereo. In an embodiment, a technique to improve stereo 123 may include the auto exposure of an object 205. In an embodiment, the auto exposure may be set for an object, rather than for an entire image. By setting the exposure according to the object, rather than the entire image which includes both the object and the background, the exposure may be set to create a high quality output of the object with minimal saturation. The auto exposure of only the object 205 may set the proper exposure according to the lighting conditions and/or features of the object. For example, only the skin tone pixels of a hand may be used to set the proper exposure of the image. When the auto exposure is set for just the object, the quality of the object in the image may be increased because the object may not be saturated.

In an embodiment, a technique to improve stereo 123 may include skin tone segmentation 210. In an embodiment, skin tone segmentation 210 may be performed in an object in a scene. Skin tone segmentation 210 may be performed on a left image and a right image. In an embodiment, skin tone segmentation 210 may be performed by leaving pixels with skin tone color untouched and setting the other pixels in the image to black. By setting the other pixels in the image to black, the background of the image may be removed.

In an embodiment, a pixel in the image may be classified as skin tone or non-skin tone based on the color of that pixel. In an embodiment, the stereo component 122 may have a set or list of pixel colors which represent skin tones. The stereo component 122 may use the set of pixel colors to identify each pixel in an image as having a skin tone or non-skin tone color. In an embodiment, skin tone may be determined by converting the pixel color into YCbCr color space. The skin tone colored pixels may be within an elliptical shape within the two dimensional color space of CbCr.

In an embodiment, the non-skin tone colored pixels may be set to black to create a high contrast image and strong edges between the skin-tone colored pixels and the background (or non-skin tone colored pixels). In an embodiment, the strong edges may increase the likelihood of a correct match. In an embodiment, performance may be increased because the stereo block matching computation is not applied to the non-skin tone colored pixels.

In an embodiment, by performing matching on only the part of the images which has a skin tone color, the computer processing unit utilization may be reduced and higher performance may be achieved. In an embodiment, the stereo block matching computations may be performed by applying a depth generation computation and/or algorithm to the pixels. In an embodiment, the computational power for matching pixels in the background may be saved as it may be unnecessary to apply the depth generation computation on the black pixels as there is no movement.

In an embodiment, a technique to improve stereo 123 may include determining a region of interest 215. In an embodiment, a scene or sequence may include multiple frames. In an embodiment, a scene may include a first frame (N) and a consecutive second frame (N+1 or N−1). In an embodiment, a first frame may be compared to a second frame of a scene to determine what object or part of the object is moving. In an embodiment, a frame may include a left image and a right image from a left camera and a right camera. In an embodiment, a first left image may be compared with a second left image and a first right image may be compared to a second right image.

In an embodiment, a first frame (N) may be compared with a second frame (N+1) in order to detect movement. In an embodiment, movement may be detected by comparing the red green blue (RGB) or gray images. In an embodiment, a position of an object in the first frame (N) may be compared with a position of the object in the second frame (N+1) to determine whether there was movement of the object.

If there are no changes in the RGB or gray images, then the stereo component may determine that there is no movement. If there is movement, the depth map may be calculated using only the region of interest. The stereo component may determine that there is movement and the pixels where movement occurred may appear brightly lit. In an embodiment, the brighter the pixel, the more movement occurred between frames. In an embodiment, a region of interest may be identified to surround the brightly lit pixels.

The stereo block matching computation may be performed on only the region of interest 215 in order to increase the accuracy of the depth map. In an embodiment, by using the region of interest, the matching between a left image and a right image may be confined to only the pixels within the region of interest and may reduce the chances for false matches and errors. In an embodiment, determining a region of interest 215 may increase performance and reduce power consumption since the stereo block matching computation may be applied to only the region of interest and no depth computation may be performed on the rest of the image.

In an embodiment, a technique to improve stereo 123 may include an adaptive setting of a disparity range 220. In an embodiment, a user or an input tracking box may set a disparity range for a frame in a scene. In an embodiment, a disparity value may be the difference or offset between a left image and a right image. The disparity value may be smaller if the object is farther away. The disparity value may be larger if the object is closer. In an embodiment, the disparity value may be the distance from the object to the camera.

In an embodiment, a histogram of past disparity values may be used to determine a disparity range. In an embodiment, a disparity range determined by the histogram may include at least the most common disparity values in one or more previous frames. In an embodiment, the disparity range may be used by the stereo component 122 instead of the stereo component searching all pixels for the disparity value of a pixel. For example, instead of searching 256 pixels in video graphics array (VGA) resolution or more pixels in high definition (HD) resolution, the disparity range 220 may be used to limit the search.

In an embodiment, the range of disparity values in the histogram plus a constant may be used to determine a disparity range. The disparity range may be used in a subsequent frame's disparity search. In an embodiment, the constant may be set according to the velocity of the movement. In an embodiment, the constant may be smaller when there is little movement between frames. In an embodiment, the constant may be larger where there is a lot of movement between frames. Stereo block matching may be performed for identified pixels based on the disparity range.

For example, the disparity values from prior frames may indicate that the disparity value is usually between 90 and 110. A constant may be determined according to the velocity of the movement. As there may be little movement between the frames, the constant may be 5. The disparity range may be between 85 and 115 (90−5 and 110+5). By mapping using only the disparity values from 85 to 115, the computational power may be increased and the power consumption may be decreased. As the disparity range may be chosen based on prior disparity values, the depth map may be improved as the search is limited to the disparity values in the range. By decreasing the search, the likelihood of a mismatch is decreased and a more accurate depth map may be provided to higher level applications such as, but not limited to, gesture recognition.

In an embodiment, a technique to improve stereo 123 may include feedback from a higher level application 225. In an embodiment, the feedback may be from a higher level application, such as, but not limited to, a body tracking application, a full body gesture application, a hand tracking application, a hand gesture application, a facial recognition application, a facial detection application and/or a facial motion application. In an embodiment, a tracking application may track and object and mark its location. For example, the tracking application can mark (x, y) the location of one or more fingers. The stereo component 122 may receive inputs such as fingers in (x11, y11) (x12, y12) in the left image and (xr1, yr1) (xr2, yr2) in the right image. The stereo component may use the feedback from the tracking application 225 to compare only the area around the (x11, y11) in the left image against (xr1, yr1) in the right image and (x12, y12) in the left image against (xr2, yr2) in the right image. By searching only the areas around the tracking points, a high quality match may be created between the left and right images.

In an embodiment, the stereo component 122 may generate a depth map by performing stereo block matching for only the pixels identified by the one or more techniques to improve stereo. Stereo block matching may only be needed for the identified pixels as the rest of the frame may remain static.

Figure 3:
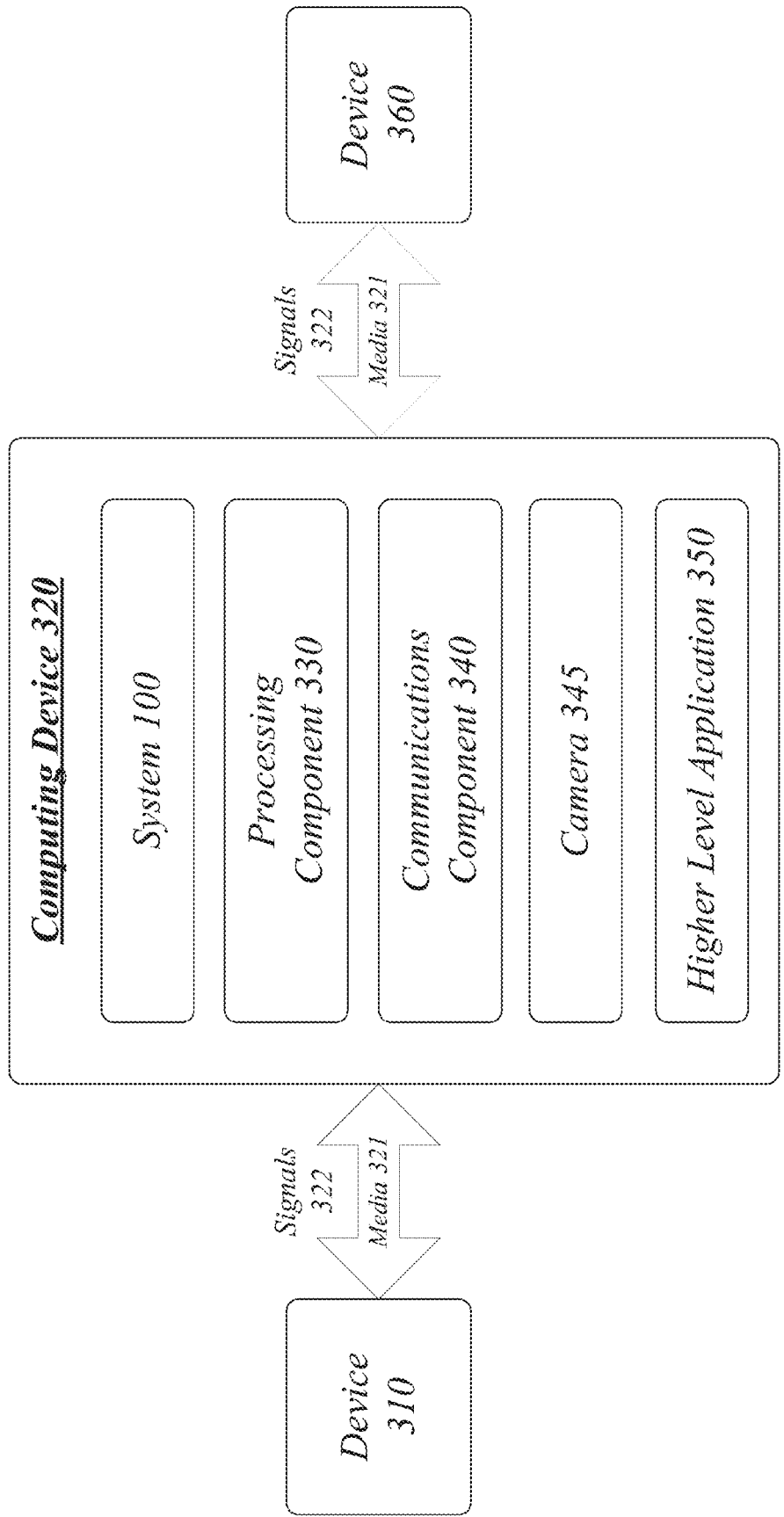
FIG. 3 illustrates an embodiment of a logic flow for the system of FIG. 1.

FIG. 3 illustrates a block diagram of a centralized system 300. The centralized system 300 may implement some or all of the structure and/or operations for the system 100 in a single computing entity, such as entirely within a single computing device 320.

The computing device 320 may execute processing operations or logic for the system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the system 100 using a communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 321 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 321.

The computing device 320 may communicate with other devices 310, 360 over a communications media 321 using communications signals 322 via the communications component 340.

The computing device 320 may include one or more cameras 345. The camera 345 may be used for obtaining a scene with an object and movement or a gesture for any application, such as, but not limited to, the gesture recognition application 120. The left camera may obtain a left image and a right camera may obtain a right image of a scene.

The computing device may include a higher level application 350. In an embodiment, the higher level application 350 may include, but is not limited to, a body tracking application, a full body gesture application, a hand tracking application, a hand gesture application, a facial recognition application, a facial detection application and/or a facial motion application. In an embodiment, the tracking application 350 may use hand tacking, hand gestures and/or a tracking device. In an embodiment, the tracking device may be worn or held by a user during a gesture. The tracking application 350 may receive signals either directly from a user or from a tracking device to determine gesture recognition. As discussed above, a stereo block matching technique may receive feedback from the higher level application 350, such as tracking application, to identify pixels of interest. The identified pixels may be used to limit the stereo block matching computations.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
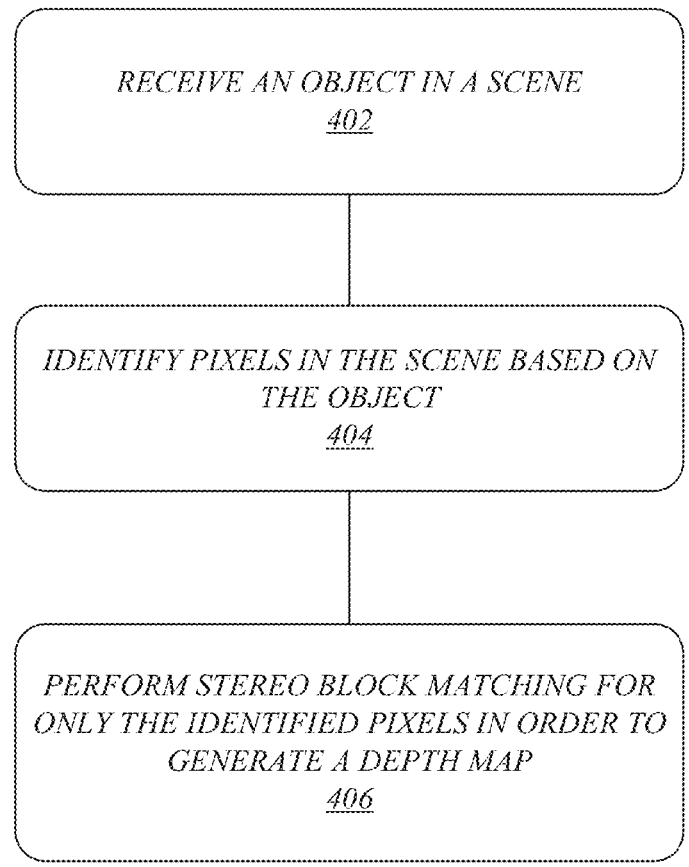
FIG. 4 illustrates an embodiment of a centralized system for the system of FIG. 1.

FIG. 4 illustrates one embodiment of a logic flow 400. The logic flow 400 may be representative of some or all of the operations executed by one or more embodiments described herein.

In the illustrated embodiment shown in FIG. 4, the logic flow 400 may receive an object in a scene at block 402. For example, a hand may be the object. In an embodiment, a user may communicate with the depth extraction application that a particular object is a target object. In an embodiment, the object may be selected by a user. In an embodiment, a user may select the object based on what is occurring in a scene. In an embodiment, a user may select an object from a list or set of objects.

In an embodiment, the application may receive a target object from another application. For example, the application may receive a target object from a higher level application such as, but not limited to, a body tracking application, a full body gesture application, a hand tracking application, a hand gesture application, a facial recognition application, a facial detection application and/or a facial motion application. For example, another application may use a target box to determine a target object. The target box may send the target object to the depth extraction application. The application may receive the target object from the target box.

The logic flow 400 may identify pixels in the scene based on the object at block 404. In an embodiment, the pixels identified may include some and/or all of the pixels of the object. In an embodiment, the pixels identified may at least partially surround the object. In an embodiment, the pixels may at least partially surround the object by a set distance. For example, the pixels may include all pixels of the object plus pixels 0.1 cm surrounding the object. In an embodiment, the pixels may include a set of pixels within the object. For example, the pixels may include one or more fingers on a hand object. The embodiments are not limited to this example.

Figures 5A, 5B:
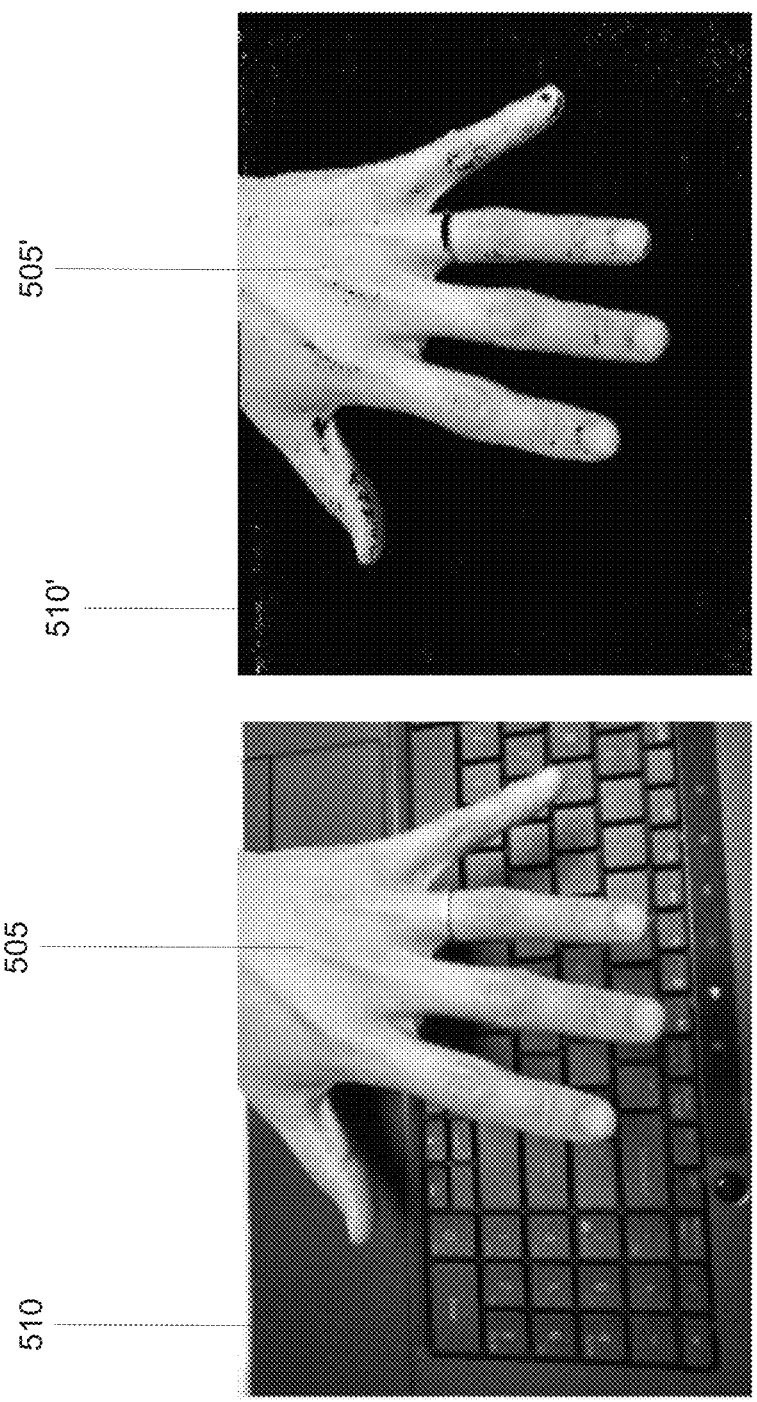
FIGS. 5A-B illustrate embodiments of skin tone segmentation. In an embodiment, the pixels with skin tone coloring may be identified.

In an embodiment, the techniques to improve stereo may be used to identify pixels in the scene based on the object. In an embodiment, a stereo block matching technique may include skin tone segmentation. FIGS. 5A-B illustrate embodiments of skin tone segmentation. In an embodiment, the pixels with skin tone coloring may be identified. In FIG. 5A, the pixels with skin tone coloring may include a hand 505. In an embodiment, the non-skin tone areas 510 of the image in the frame may be set to black. In an embodiment, the pixels with skin tone coloring may be identified. In FIG. 5B, the skin tone segmentation may set all the non-identified pixels 510' in the scene to black. For example, the non-skin tone colored pixels 510', such as the keyboard, may be set to black. The identified skin tone colored pixels of the hand 505' may be unchanged. Referring back to FIG. 4, the logic flow 400 may perform stereo block matching for only the identified skin tone colored pixels in order to generate a depth map at block 406.

Figure 6B:
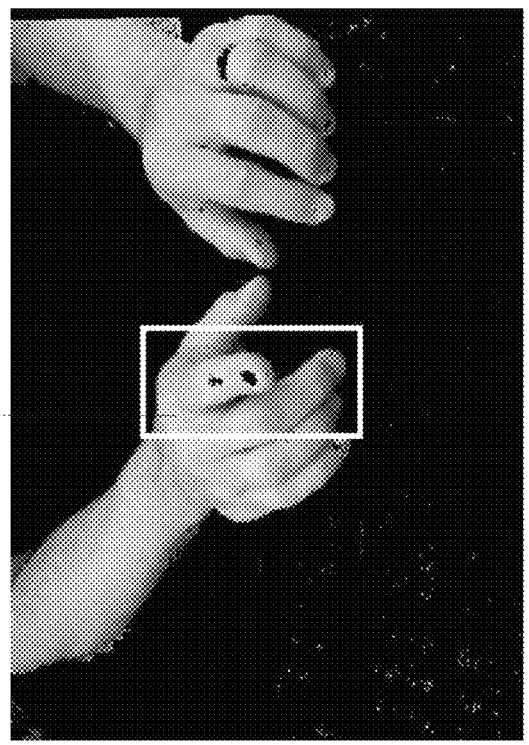
FIGS. 6A-B illustrate embodiments of a movement based region of interest.
Figure 6A:
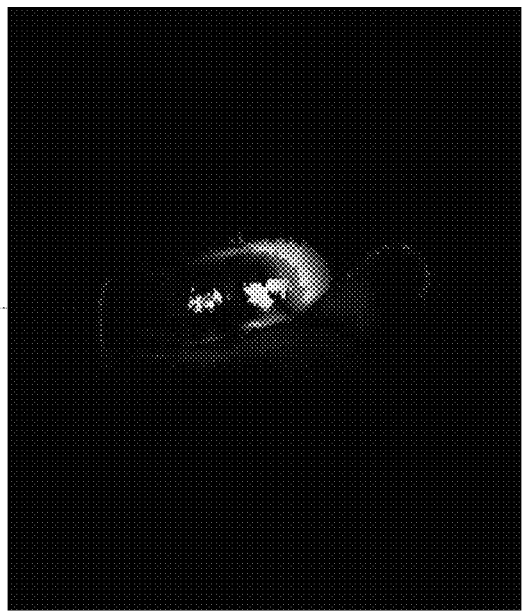

In an embodiment, a stereo block matching technique may include determining a region of interest. FIGS. 6A-B illustrate embodiments of a movement based region of interest. In an embodiment, a first and second frame in a scene may be determined. In an embodiment, a first frame may be frame N. A second frame may be frame N−1 or frame N+1. A position of the object in the first frame may be compared with a position of the object in the second frame to determine movement of the object. In an embodiment, the object may be a user's hand. One or more fingers of the user may have moved between the first frame and the second frame. For example, the user's right index finger and middle finger may have moved. In an embodiment, the movement may be detected by comparing the first frame (N) and the second frame (N+1). In an embodiment, the RGB or gray images may be compared in order to detect movement.

In FIG. 6A, the difference between the left frame and the right frame may be illustrated by the bright pixels 605. As the brightness of the pixels indicates movement, a region of interest may be determined on a subsequent frame. In FIG. 6B, based on the prior frames (N, N+1), a region of interest 610 may be created around the bright pixels in the image shown in FIG. 6A. A region of interest 610 may be created around where the object moved. In an embodiment, the region of interest 610 may surround the movement between the first frame (N) and second frame (N+1) and may be used to predict where movement may occur in a third sequential frame (N+2). In FIG. 6B, the region of interest 610 may surround the user's right index finger and middle finger as the bright pixels in FIG. 6A indicated that the user's right index finger and middle finger were moving. In an embodiment, the identified pixels may be set to the pixels in the region of interest. In an embodiment, stereo block matching computations may be performed on only the region of interest. By performing stereo block matching on only the region of interest, a high quality depth map may be determined using low power and achieving high performance.

In an embodiment, a stereo block matching technique may include determining a disparity pixel range or disparity range. In an embodiment, a disparity range in a first frame of a scene may be determined. Pixels in a second frame of the scene may be identified based on the disparity range. For example, a histogram may be computed of disparity values. In an embodiment, a most common disparity range in a histogram may be determined for a first frame. A most common disparity range may be the pixel numbers which were most frequently used in the first frame.

In an embodiment, a constant may be determined. A constant may be determined according to the velocity of movement. A smaller constant may be chosen when there is less movement between sequential frames. A larger constant may be chosen when there is more movement between sequential frames. The constant may be chosen so that the disparity range encompasses the disparity values in a second frame. In an embodiment, a disparity range may be determined by adding and subtracting the constant to a set of the disparity values in the histogram. In an embodiment, a disparity range may be determined by adding and subtracting the constant to the most common disparity range.

For example, a histogram may be created with disparity values. The most common disparity values may be within the pixel range from 90 to 100. A constant may be determined. The constant may be based on whether the movement of the object is faster or slower. In an embodiment, the movement may be faster, so the constant may be 15 in order to ensure that the disparity values are captured in a subsequent frame. The disparity range may be from 75 to 115 (90−15 to 100+15).

Figure 7:
FIG. 7 illustrates an embodiment of exemplary feedback from a tracking application.

In an embodiment, a stereo based matching technique may include feedback from a higher level application. FIG. 7 illustrates an embodiment of exemplary feedback from a tracking application. A tracking application may include a tracking device. In FIG. 7, the tracking device may be worn on the user's hand. In an embodiment, the tracking application may mark an object that was tracked via a tracking device. The information may be the input to the stereo component 122 in the depth extraction application 120. As shown in FIG. 7, the pixels of interest may be the brightly lit pixels 705 presented on a user's hand. In an embodiment, the pixels of interest may be the inputs of the tracking application. In an embodiment, the stereo component may receive pixel location inputs such (x13, y13) (x14, y14) pixels in the left image and (xr3, yr3) (xr4, yr4) pixels in the right image. The stereo component may use the feedback from the higher level application to compare only the area around the (x13, y13) pixels in the left image against (xr3, yr3) pixels in the right image and (x14, y14) pixels in the left image against (xr4, yr4) pixels in the right image. By searching only the areas around the tracking points, a high quality match may be created between the left and right images. As the search between the left image and the right image is limited, there is less likelihood of a mismatch. The embodiments are not limited to this example.

Referring back to FIG. 4, the logic flow 400 may generate a depth map by performing stereo block matching computations for only the identified pixels at block 406. The skin tone segmentation, the auto authentication, the movement to determine a region of interest, the adaptive setting disparity range and/or the feedback from a higher level application may be used to identify pixels and the stereo block matching may be performed on only those identified pixels. By performing stereo block matching computations on only the identified pixels in the scene, performance may be increased by limiting the search area. Accuracy of the matching may be increased as there may be fewer opportunities for false matching.

Figure 8:
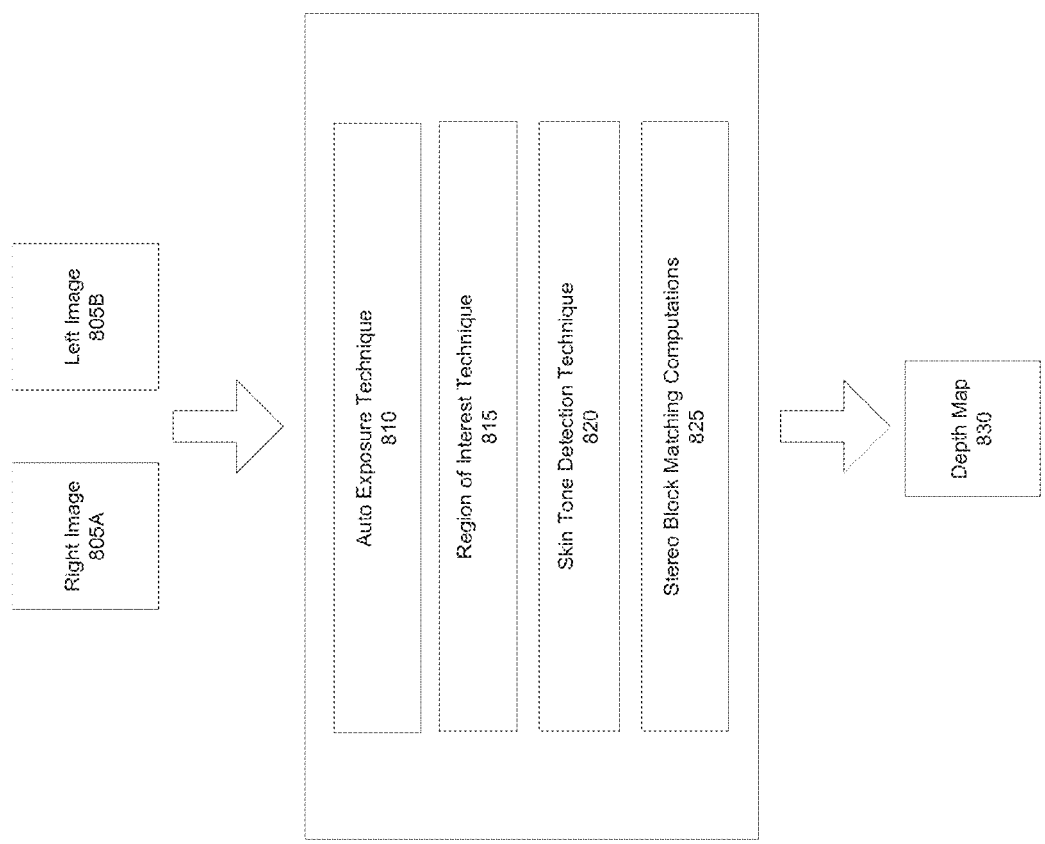
FIG. 8 illustrates an embodiment of applying multiple techniques to improve stereo to a scene.

FIG. 8 illustrates an embodiment of applying multiple techniques to improve stereo to a scene. In an embodiment, multiple techniques to improve stereo may be used to identify pixels for computing the depth map. In an embodiment, an image pair 805A, B may include a scene of a hand at a keyboard. In an embodiment, the target object may be the hand.

In an embodiment, auto exposure 810 may be performed on the image. In an embodiment, auto exposure may be performed based on only the object. For example, the object may be the hand. The auto exposure 810 may be performed on just the hand. As a result, the hand may not be saturated due to the dark background and the depth map output may be improved.

The stereo component may use the image pair 805A, B to determine a region of interest 815. The region of interest technique 815 may include comparing a first frame or image pair of a scene with a second frame or image pair of the scene. In an embodiment, the movement between the hand in the first frame and the hand in the second frame may be displayed by the brightness of the pixels. In an embodiment, the brighter the pixels, the more movement. In an embodiment, the stereo component may determine a region of interest including the brightly lit pixels.

In an embodiment, after pixels are identified using movement to create a region of interest 815, a skin tone segmentation 820 may be performed on the image pair 805A, B. In an embodiment, the skin tone segmentation 820 may be performed by leaving pixels with skin tone color untouched and setting the other pixels to black. In an embodiment, the hand may be classified as having a skin tone color and thus the skin tone segmentation may leave the pixels of the hand untouched. However, the skin tone segmentation 815 may set the keyboard and the rest of the background to black. By keeping the color of the pixels depicting the hand and setting the rest of the pixels to black, a high contrast image with strong edges between the hand and the background may be created.

In an embodiment, the stereo block matching computations 825 may be performed based on the auto-exposure, the region of interest and the skin segmentation techniques. By using a combination of techniques, the depth map quality may be improved and performance may be increased while the power consumed may be decreased as only pixels identified by the techniques may be part of the stereo block matching computations 825. Based on the stereo block matching computations, a depth map 830 output may be created. The embodiments are not limited to this example.

Figure 9:
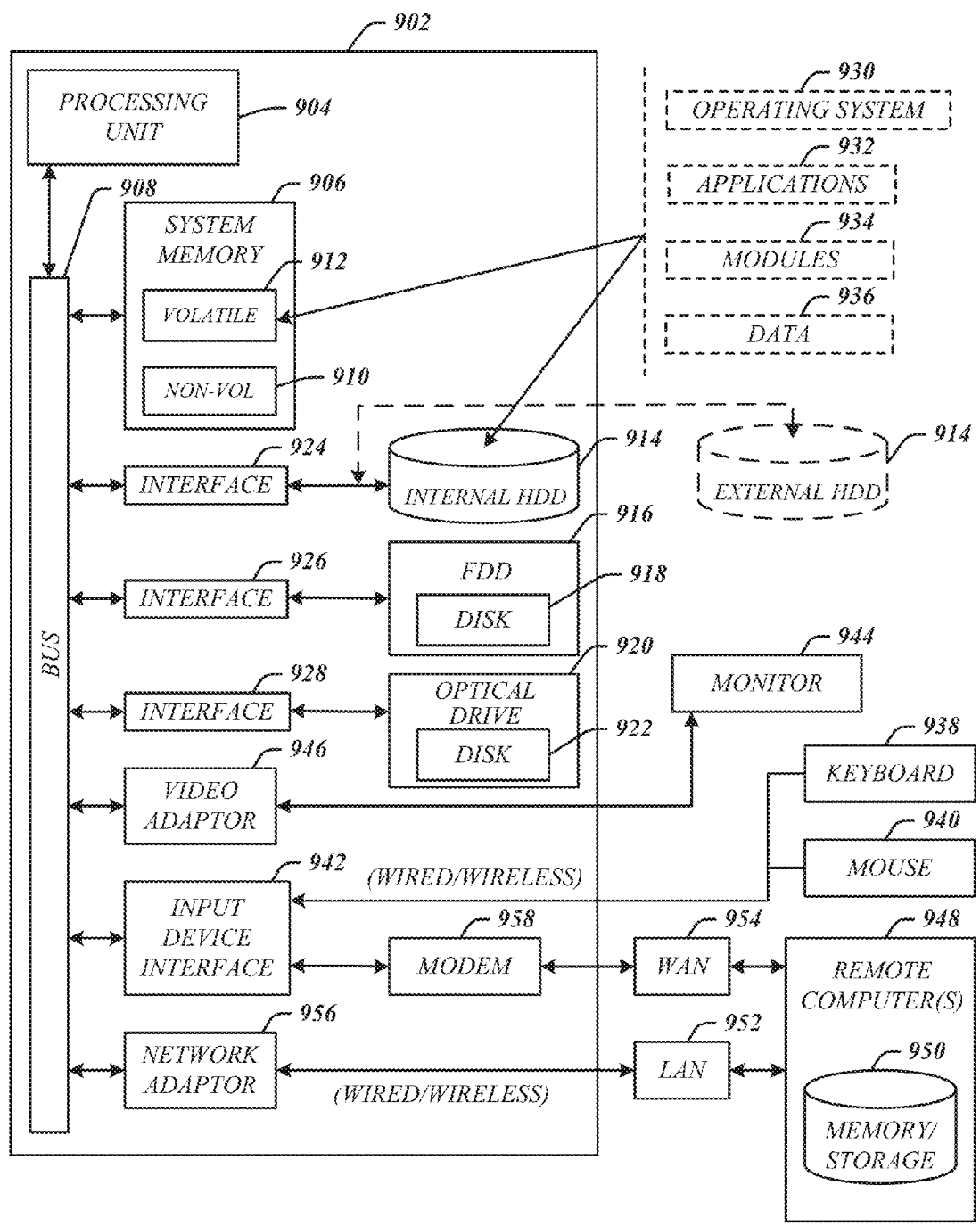
FIG. 9 illustrates an embodiment of a computing architecture.

FIG. 9 illustrates an embodiment of an exemplary computing architecture 900 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 900 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 900 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Dual microprocessors and other multi-processor architectures may also be employed as the processing unit 904. The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures.

The computing architecture 900 may comprise or implement various articles of manufacture. An article of manufacture may comprise a computer-readable storage medium to store logic. Embodiments may also be at least partly implemented as instructions contained in or on a non-transitory computer-readable medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936.

The one or more application programs 932, other program modules 934, and program data 936 can include, for example, the stereo component 122.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
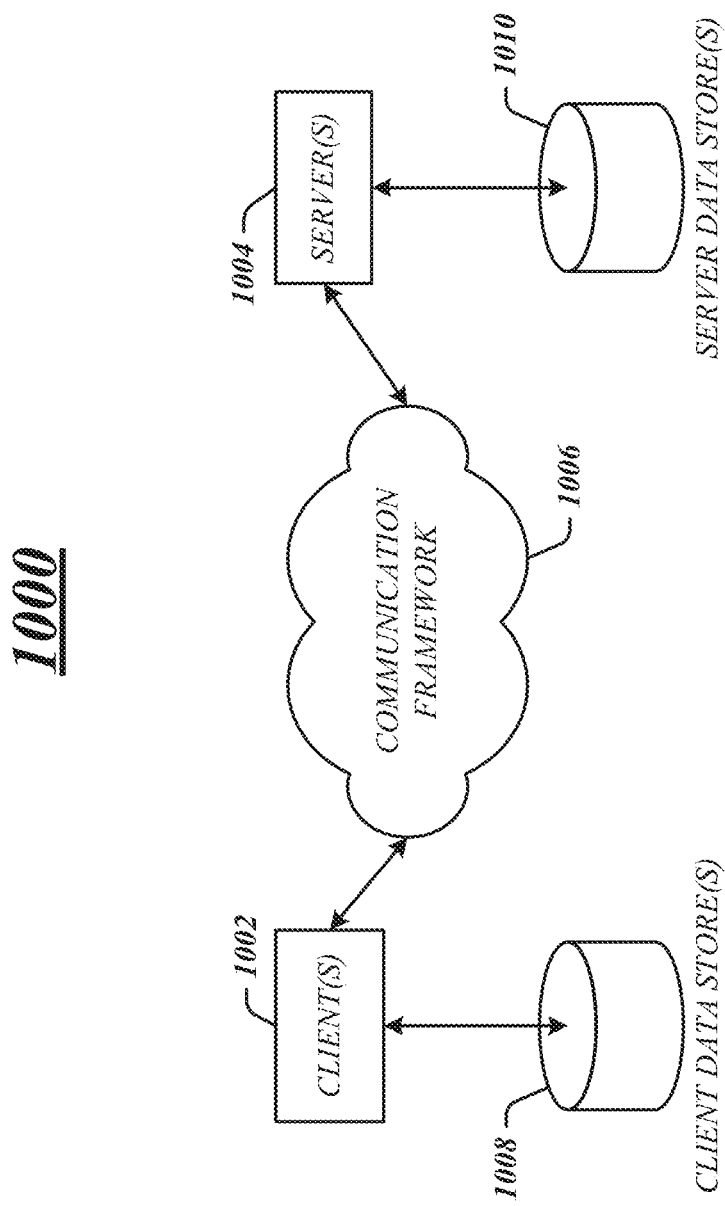
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 10, the communications architecture 1000 comprises includes one or more clients 1002 and servers 1004. The clients 1002 may implement the client systems 410. The servers 1004 may implement a server system. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 806 may implement any well-known communications techniques and protocols, such as those described with reference to systems 400 and 900. The communications framework 806 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An article of manufacture comprising a storage medium containing instructions that when executed cause a system to:
    receive an object from a plurality of left images and a plurality of right images of a scene;
    determine a first frame and a second frame in the scene;
    compare a position of the object in the first frame with a position of the object in the second frame to determine movement of the object;

identify pixels in the scene based on the movement of the object; and
perform stereo block matching for only the identified pixels using a depth generation computation based on at least a portion of the plurality of right images and the plurality of left images.

2. The article of manufacture of claim 1, comprising instructions that when executed cause the system to:
create a region of interest around the movement of the object; and
set the identified pixels to pixels in the region of interest.

3. The article of manufacture of claim 1, comprising instructions that when executed cause the system to identify the pixels via a tracking application.

4. The article of manufacture of claim 1, comprising instructions that when executed cause the system to:
identify the pixels with skin tone coloring; and
set the non-identified pixels in the scene to black.

5. The article of manufacture of claim 1, comprising instructions that when executed cause the system to perform auto exposure on only the identified pixels.

6. The article of manufacture of claim 1, comprising instructions that when executed cause the system to:
determine a disparity range in a first frame in the scene; and
perform stereo block matching in a second frame of the scene based on the disparity range.

7. The article of manufacture of claim 1, comprising instructions that when executed cause the system to:
compute a histogram of disparity values;
determine a disparity range by adding and subtracting a constant to a set of the disparity values in the histogram; and
perform stereo block matching for the identified pixels based on the determined disparity range.

8. The article of manufacture of claim 1, comprising instructions that when executed cause the system to generate a depth map.

9. The article of manufacture of claim 1, comprising instructions that when executed cause the system to receive the object based on content knowledge from a user.

10. A method comprising:
determining an object from a plurality of left image and a plurality of right images of a scene;
determine a first frame and a second frame in the scene;
compare a position of the object in the first frame with a position of the object in the second frame to determine movement of the object;
identifying pixels in the scene based on the movement of the object; and
performing stereo block matching for only the identified pixels using a depth generation computation based on at least a portion of the plurality of right images and the plurality of left images in order to generate a depth map.

11. The method of claim 10, comprising:
determining the object based on user input.

12. The method of claim 10, comprising:
determining a portion of the scene based on the identified pixels; and
performing stereo block matching for only the portion of the scene.

13. The method of claim 10, comprising:
creating a region of interest around the movement of the object; and
setting the identified pixels to pixels in the region of interest.

14. The method of claim 10, comprising:
identifying the pixels via a tracking application.

15. The method of claim 10, comprising:
identifying the pixels with skin tone coloring; and
setting non-identified pixels in the scene to black.

16. The method of claim 10, comprising:
performing auto exposure on only the identified pixels.

17. The method of claim 10, comprising:
determining a disparity range in a first frame in the scene; and
performing stereo block matching in a second frame of the scene based on the disparity range.

18. The method of claim 10, comprising:
determining a pixel range in a histogram;
determining a constant;
determining a disparity range by adding and subtracting the constant to the pixel range; and
performing stereo block matching for the identified pixels based on the determined disparity range.

19. The method of claim 10, comprising:
performing auto exposure on only the identified pixels;
determining that the identified pixel comprise skin tone coloring; and
setting the non-identified pixels in the scene to black.

20. An apparatus, comprising:
a processing unit; and
a stereo component operative on the processing unit to:
receive an object from a plurality of left images and a plurality of right images of a scene;
determine a first frame and a second frame in the scene;
compare a position of the object in the first frame with a position of the object in the second frame to determine movement of the object;
identify pixels in the scene based on the movement of the object; and
perform stereo block matching for only the identified pixels using a depth generation computation based on at least a portion of the plurality of right images and the plurality of left images.

21. The apparatus of claim 20, the stereo component operative on the processing unit to:
create a region of interest around the movement of the object; and
set the identified pixels to pixels in the region of interest.

22. The apparatus of claim 20, the stereo component operative on the processing unit to:
identify the pixels with skin tone coloring; and
set the non-identified pixels in the scene to black.

23. The apparatus of claim 20, comprising:
a digital display communicatively coupled to the processing unit.

24. A system, comprising:
a processing unit;
a memory unit to store a stereo component;
an operating system to load the stereo component on the processing unit, the stereo component operative on the processing unit to:
receive an object from a plurality of left images and a plurality of right images of a scene;
determine a first frame and a second frame in the scene;
compare a position of the object in the first frame with a position of the object in the second frame to determine movement of the object;
identify pixels in the scene based on the movement of the object; and
perform stereo block matching for only the identified pixels using a depth generation computation based on at least a portion of the plurality of right images and the plurality of left images; and an interface to communicate information between the processing unit and the operating system.

25. The system of claim 24, the stereo component operative on the processing unit to:

identify the pixels with skin tone coloring; and set the non-identified pixels in the scene to black.

26. The system of claim 24, the stereo component operative on the processing unit to:

perform auto exposure on only the identified pixels.

27. The system of claim 24, the stereo component operative on the processing unit to:

determine a disparity range in a first frame in the scene; and perform stereo block matching in a second frame of the scene based on the disparity range.

28. The system of claim 24, the stereo component operative on the processing unit to:

determine a portion of the scene based on the identified pixels; and perform stereo block matching computations for only the portion of the scene.

* * * * *